March 18, 1947.  D. B. PARKINSON  2,417,442
POTENTIOMETER CIRCUIT
Filed June 9, 1944  2 Sheets-Sheet 1

INVENTOR
D. B. PARKINSON
BY
AGENT

March 18, 1947.  D. B. PARKINSON  2,417,442
POTENTIOMETER CIRCUIT
Filed June 9, 1944   2 Sheets-Sheet 2
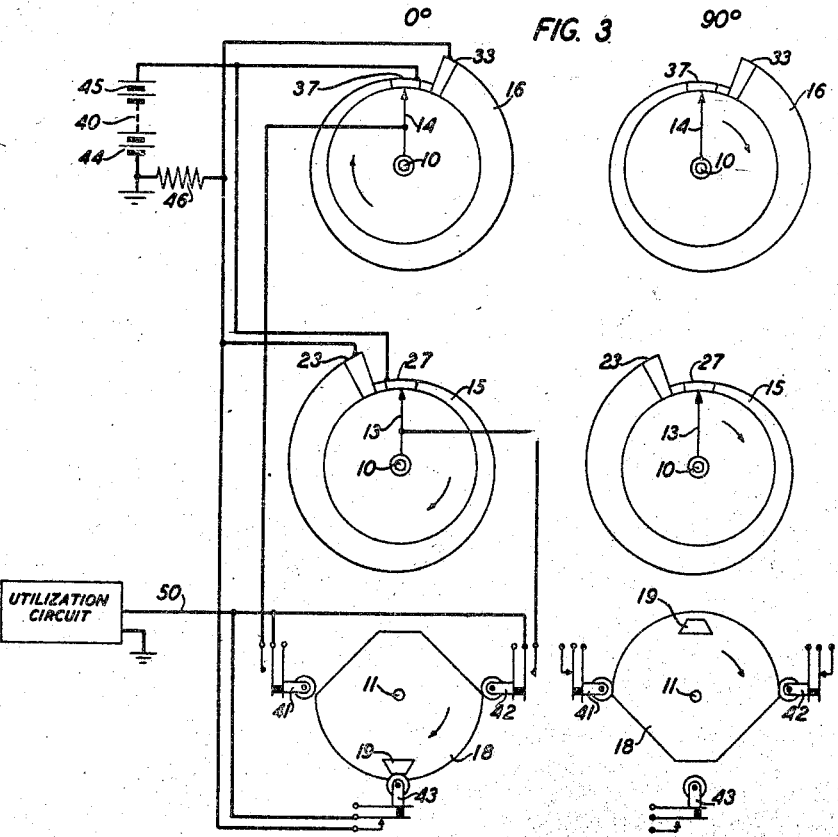
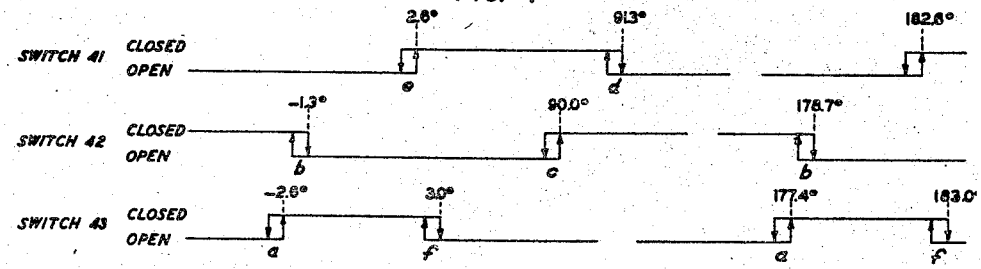
INVENTOR
D. B. PARKINSON
BY
AGENT Patented Mar. 18, 1947

2,417,442

UNITED STATES PATENT OFFICE 2,417,442

POTENTIOMETER CIRCUIT

David B. Parkinson, Maplewood, N. J., assignor to Bell Telephone Laboratories, Incorporated, New York, N. Y., a corporation of New York Application June 9, 1944, Serial No. 539,452

4 Claims. (Cl. 171—229)

This invention relates to an improvement in potentiometer circuits and provides a pair of potentiometer cards of special shape and switching means in the circuit therewith associated, whereby a given voltage may be fractionated in proportion to, for example, the sine of a desired angle over the greater portion of two consecutive quadrants thereof. Among the purposes served by the invention is the furnishing to an electrical fire control computing system of a voltage representing the sine of the angle subtended at a target by a base line between two observing stations or gun positions.

In the triangle formed by lines joining the two positions and the target, no angle ever exceeds 180 degrees, and it is found in practice that the angle at the target itself is adequately represented if its sine is accurately followed from 3 degrees to 177 degrees. The sine never becomes negative. The same is true of the angles at each end of the base line, and the invention is conveniently described with reference to a telescope shaft turning in azimuth from 0 degree to 180 degrees. Of course, the shaft so turning may be, instead of a telescope, a part of the fire control system and may be operated locally or by remote control.

For such use, the potentiometer cards of the invention and the associated circuit derive from a fixed source of voltage a fractional voltage of the character required for a utilization circuit with an accuracy four times that obtainable with the usual potentiometer card of the same diameter and fineness of winding. It is therefore the object of the invention to provide a potentiometric system capable of realizing such a fourfold increase in accuracy.

The invention will be understood from the following description, read with reference to the accompanying drawings, in which.

Figure 1:
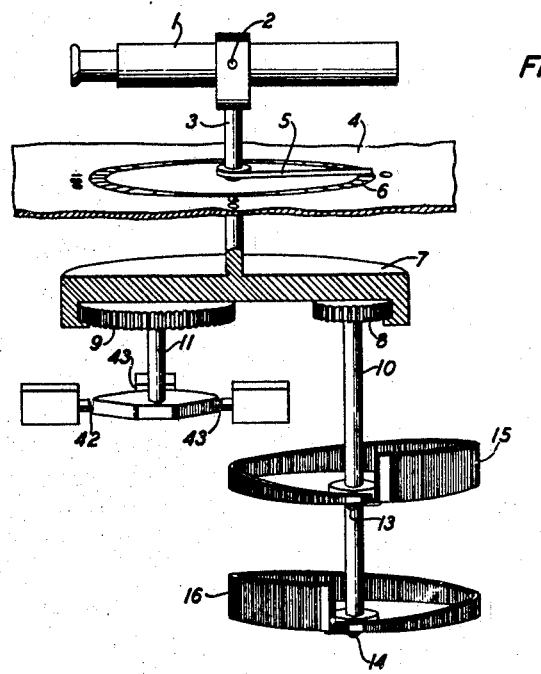
Fig. 1 illustrates the mechanism of the invention as applied to a telescope with which may be observed a desired angle, say the azimuth of a target.

Fig. 3 shows the circuit connections and switching means associated with potentiometers 15 and 16; and Fig. 4 includes graphs showing the successive connections effected as telescope 1 of Fig. 1 turns through 180 degrees in azimuth.

In all figures, like numerals designate like elements.

Referring to Fig. 1, telescope 1 is free to turn about a horizontal axis 2 and also about a vertical axis, that of shaft 3, which is so mounted on table 4 that pointer 5 turning with shaft 3 travels over a graduated circle 6 on which the position of pointer 5 may indicate the azimuth of an object sighted by telescope 1.

Prolonged below table 4, shaft 3 carries gear 7 within which are meshed gears 8 and 9, the diameters of which are respectively one-quarter and one-half that of gear 7. Gears 8 and 9 are carried, respectively, on shafts 10 and 11 which therefore turn at four times and at twice, respectively, the speed of shaft 3. Shaft 10 carries near its lower end brushes 13 and 14 sweeping over potentiometers 15 and 16, respectively, each of which is concentric with shaft 10. Shaft 11 carries cam 18 provided with lug 19, the form of which is better shown in Fig. 3. Around the periphery of cam 18 are disposed three switches 41, 42 and 43, the functions of which will appear in the description of Fig. 3. Suitable supporting means for the elements above identified are understood but not shown.

In the following description, the angles referred to will, unless otherwise designated, refer to the angular position of shaft 3.

Figure 2:
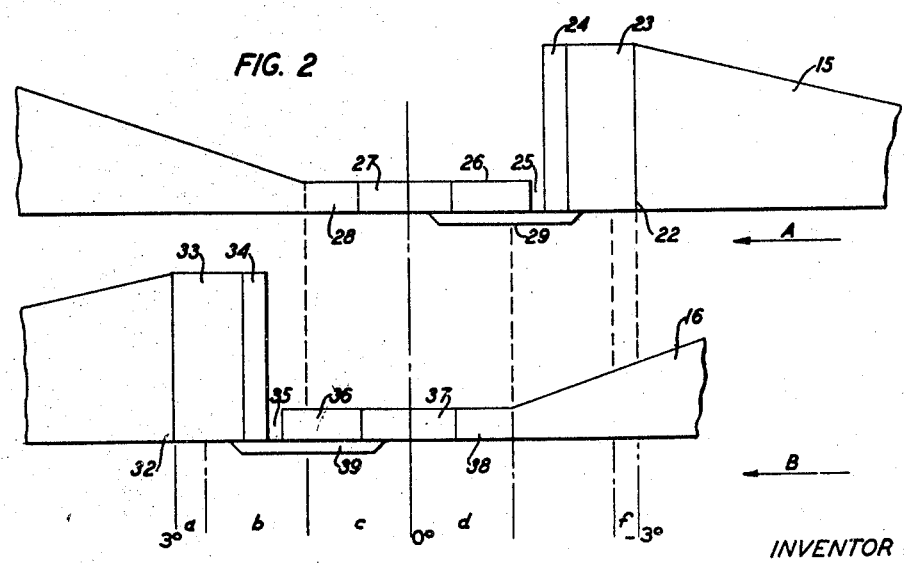
Fig. 2 shows details of the ends of potentiometers 15 and 16 of Fig. 1.

Fig. 2 shows the manner in which are terminated the windings of potentiometers 15 and 16. Each potentiometer is wound on a card formed into a nearly complete circle, the gap being closed by an insulating bridge in passing over which the potentiometer brush is lifted from contact with the winding. For each potentiometer the winding has a resistance per turn varying nearly in accordance with a cosine function over about 343 degrees of the potentiometer circle and a voltage impressed across the ends of the winding may be sinusoidally fractionated by a brush sweeping the winding from thin to the fat end thereof. These ends are separated in the circle into which the potentiometer card is formed, by a short gap occupying an arc corresponding to about 0.2 degree of azimuth on circle 6 or 0.8 degree of the potentiometer circle itself.

In Fig. 2, fat end 22 of the winding of potentiometer 15 is succeeded by a short-circuited portion 23, following which is a block of insulating material 24. In terms of telescope azimuth, portion 23 occupies about 1 degree, block 24 about 0.3 degree. Gap 25, 0.2 degree in arc, separates block 24 from another insulating block 26, about 1.0 degree in extent, which with short-circuited portion 27 terminates thin end 28 of the winding. Short-circuited portion 27 is somewhat more than 1 degree of azimuth in extent, and the potentiometer winding near end 28 has a constant resistance per turn over an arc of about 0.7 degree. Similarly, for potentiometer 16, fat end 32 is succeeded by short-circuited portion 33 and insulating block 34. Gap 35 intervenes between block 34 and insulating block 36 which is affixed to short-circuited portion 37 terminating thin end 38 of this potentiometer winding. An insulating bridge 29, about 2 degrees in extent, overlaps blocks 24 and 26 and gap 25 of potentiometer 15. A similar bridge 39 is provided overlapping blocks 34 and 36 and gap 35 of potentiometer 16.

As shown in Fig. 2 and again in the diagram of Fig. 3 potentiometers 15 and 16 are so centered one above the other concentrically with shaft 10 as to be symmetrical about a diametral plane passing through the outer of short-circuited portions 27 and 37. The center of bridge 29 is at 1.3 degrees of azimuth, that of bridge 39 at 178.7 degrees, conveniently called —1.3 degrees.

In Fig. 2 arrows A and B indicate the direction of motion of brushes 13 and 14 in crossing bridges 29 and 39, respectively. The resistance per turn of each potentiometer winding is made proportional at the fat end to the sine of 3 degrees, decreasing from that value in such manner that for any angle on circle 6 the sine of that angle is represented by the potentiometer resistance included between the fat end and the corresponding brush together with series resistance 46 later mentioned.

The azimuth interval of 6 degrees, centered at 0 degree on circle 6, between the extreme ends of short-circuited portions 23 and 33 is subdivided into intervals a, b, c, d, e and f allowed for the operation of the switches described in connection with Fig. 3.

Referring now to Fig. 3, there is shown at the left the aspect of brushes 14 and 13 and of cam 18, together with the position of switches 41, 42 and 43 when shaft 3 is in the position corresponding to azimuth 0 degree. Negative terminal 44 of battery 40 is permanently grounded while the positive terminal 45 is permanently connected to short-circuited portions 27 and 37 of potentiometers 15 and 16, respectively. The short-circuited portions 23 and 33 of these potentiometers are permanently connected to one terminal of resistance 46, the other terminal of which is grounded. Whatever the positions of brushes 13 and 14, battery 40 faces an impedance which is that of the two potentiometer windings in parallel and these in series with resistance 46. Utilization circuit 50, of which one terminal is grounded, is at its other terminal connection to the junction of resistance 46 and short-circuited portions 23 and 33 when switch 43 is closed, to brush 13 when switch 42 closes, or to brush 14 when switch 41 closes.

Switch 43 is closed by lug 19 near 0 degree and near 180 degrees of azimuth, in each case over an azimuth interval of about 5.6 degrees nearly centered at 0 degree or at 180 degrees. At such azimuth, switches 41 and 42 are both open and to circuit 50 there is applied a constant fraction of the voltage of battery 40. This fraction is the ratio of resistance 46 to the total resistance connected across battery 40 and is for the purpose of the invention chosen to be the sine of 3 degrees.

As shown in Fig. 3 corresponding to azimuth 0 degree on circle 6 of Fig. 1, shaft 10 places brushes 13 and 14 centrally on the short-circuited thin portions 27 and 37 of their respective potentiometers while shaft 11 places cam 18 to close switch 43, leaving open switches 41 and 42. The voltage applied is as above stated proportional to the sine of 3 degrees and so continues as shaft 3 rotates to that azimuth angle during which at 2.6 degrees switch 41 is closed to connect circuit 50 to brush 14 as well as to resistor 46. Passing from 0 degree, brush 14 was disconnected by bridge 39 from the winding of potentiometer 16, retaining contact therewith at about 2.3 degrees. At 3 degrees, switch 43 opens, leaving circuit 50 connected only to brush 14, and further rotation of shaft 3 causes circuit 50 to be connected to an increasing portion of the winding of potentiometer 16 in series with resistance 46, whereby the voltage impressed on circuit 50 varies proportionally to the sine of the angle read on circle 6.

At the right in Fig. 3 there is shown the aspect of brushes 14 and 13 and of cam 18 together with the position of switches 41, 42 and 43 for the setting of shaft 3 at azimuth 90 degrees, a configuration which would be repeated at azimuth 270 degrees. As previously indicated, no angle to be observed can exceed 180 degrees.

During the rotation of shaft 3 to 3 degrees, brush 13 has moved from the short-circuited thin portion of its card on to the effective winding of its potentiometer, but switch 42 being open the position of brush 13 does not influence the output voltage. Continuing the clockwise rotation of shaft 3, brush 14 moves up on its potentiometer applying to circuit 50 a voltage increasing as the sine of the azimuth. This voltage increases as the sine of the angle until the telescope has rotated 88.7 degrees, at which time brush 14 reaches the linear part of its potentiometer winding and the voltage thereafter increases linearly to 89.4 degrees, where the short-circuited portion begins so that no further increase in voltage takes place. At 90 degrees switch 42 closes and circuit 50 is now connected both to brush 14 and to brush 13. Each of these brushes is centered on the short-circuited thin portion of the corresponding winding. It will be seen that for this quarter turn of the telescope the voltage to circuit 50 starts as the sine of 3 degrees, remaining constant until the azimuth is 3 degrees after which the voltage rises as the sine of the angle to 88.7 degrees. The linear increase in voltage from 88.7 degrees to 89.4 degrees is sensibly the same as if the voltage had increased strictly as the sine to a value which is, with a negligible error, equal to unity.

As just stated at 90 degrees circuit 50 is connected to both brushes simultaneously and with further rotation of the telescope brush 14 is disconnected from the line by the opening of switch 41 at 91.3 degrees. At this point brush 13 has reached the point in its winding at which the voltage begins to decrease as the sine of the angle and continues so to decrease until the azimuth is 177 degrees. Here brush 13 reaches the short-circuited fat end of its winding and circuit 50 is connected therethrough to resistance 46. Shortly thereafter switch 43 again closes and circuit 50 is connected to resistance 46 directly as well as through brush 13. Brush 13 now is lifted from the card by the insulating bridge and at 178.7 degrees is disconnected from circuit 50 by the opening of switch 42.

In the clockwise rotation described in the foregoing circuit 50 has been directly connected to the resistance from —2.6 degrees to 3 degrees. Thereafter from 3 degrees to 90 degrees it is connected only to brush 14, brush 13 having rotated with brush 14 but inactively. From 90 degrees to 91.3 degrees circuit 50 is connected to brushes 14 and 13 simultaneously and from 91.3 degrees to 177.4 degrees is connected only to brush 13, brush 14 having been inactive in this second revolution of the quadruple speed shaft.

In the counter-clockwise direction of rotation allowance is made for the operation of the switches which means that these operate not at the values of azimuth given in the foregoing but at values 0.4 of a degree algebraically less in each case. Near zero and near 180 degrees, circuit 50 is connected directly to resistance 46 for 5.6 degrees of azimuth. Overlapping this connection near zero is first the connection of circuit 50 through switch 42 to brush 13 and then through switch 41 to brush 14. It will be observed that there is an interval of about 4 degrees (from −1.3 to 2.6) in the clockwise direction where neither brush is connected to circuit 50 and the output voltage is that across resistance 46 alone, viz., the sine of 3 degrees or about 5 per cent of the total voltage from battery 40. Circuit 50 receives a voltage varying proportionally with the sine of the azimuth angle from the sine of 3 degrees through unity to the sine of 177 degrees, and repeats this curve without reversal of sign. From −2.6 degrees to 3 degrees the output voltage is numerically the sine of 3 degrees and likewise for 177.4 degrees to 183 degrees it has this value. Between 89.4 degrees and 90.6 degrees the output voltage is the full input voltage. The first quadrant is supplied by brush 14, the second quadrant by brush 13, these supplies overlapping in the neighborhood of 90 degrees and being separately overlapped by the direct connection to the resistance in the neighborhood of zero and 180 degrees. The third and fourth quadrants, if followed, repeat the first and second, respectively.

The graphs of Fig. 4 show the successive openings and closing of switches 41, 42 and 43. In the direction of increasing azimuth, switch 41 connects circuit 50 to brush 14 at 2.6 degrees, disconnect at 91.3 degrees, respectively. Switch 42 connects circuit 50 to brush 13 at 90 degrees disconnecting at 178.7 degrees, repeating each operation 180 degrees later. By switch 43, circuit 50 is connected to the ungrounded end of resistance 46 from −2.6 degrees to 3 degrees and from 177.4 degrees to 183 degrees. For the reverse direction of rotation of shaft 3, azimuth intervals allowed for the operation of the switches are indicated by the letters *a* to *f*. Intervals *a* and *f* are each about 0.4 degree, intervals *b*, *c*, *d* and *e* each about 1.3 degrees, so that the closure of switch 43 always overlaps the operation of switches 41 and 42 near zero and 180 degrees.

A complete rotation of each brush corresponds to one-fourth rotation of the telescope so that the whole potentiometer is available to do the work that would be done in the ordinary trigonometric potentiometers in only one-quarter of the complete winding. With a winding of the same coarseness in each case the circuit of the invention obtains four times the accuracy of the conventional circular potentiometer of the same diameter, a result made possible by the fact that it is unnecessary to follow the sine of the angle strictly in the neighborhood of zero and 180 degrees.

What is claimed is:

1. For an electrical computer, means for providing a voltage representing a term required by said computer including a source of voltage, a first potentiometer means for deriving from said source a voltage representing said term over a first limited range thereof, a second potentiometer means for deriving from said source a voltage representing said term over a second limited range thereof overlapping said first range, a utilization circuit and switching means for sequentially applying said derived voltages to said circuit.

2. A potentiometer circuit including a pair of potentiometers having each a desired type of winding formed into a nearly complete circle and provided with an insulating bridge completing said circle, said potentiometers being in position coaxially with a first rotating shaft, a pair of radial brushes carried on said first shaft and sweeping individually said potentiometers, said brushes being insulated from said first shaft and from each other, an input circuit connected in series with a resistance and said potentiometers in parallel, an output circuit adapted to be connected successively across said resistance alone and across said resistance in series with one and then with the other of said brushes, a plurality of switches successively operable to effect said successive connections, a second rotating shaft having an angular velocity half that of said first shaft, and a cam carried on said second shaft to effect the operation of said switches.

3. Means for deriving from a given voltage a second voltage varying substantially in accordance with a desired function of the angular position of a given shaft including a pair of potentiometers connected in parallel and wound individually in accordance with said function and on cards formed into nearly complete coaxial circles, a pair of brushes individually traversing said potentiometers and mounted parallel to each other on a second shaft coaxial with said circles, means associated with said given shaft for driving said second shaft at four times the rate of rotation of said given shaft, an output circuit having a pair of terminals one of said terminals being connected through a resistance to one junction of said potentiometers, the other of said terminals being connected successively to said junction, to one and to the other of said brushes, a plurality of switches for effecting said successive connections, a third shaft provided with a cam for controlling said switches and means associated with said given shaft for driving said third shaft at twice the rate of rotation of said given shaft.

4. Means for deriving from a first voltage a second voltage related to said first voltage substantially in accordance with a desired function of the angular position of a given rotating shaft, comprising a pair of potentiometers connected in parallel with each other and jointly in series with a resistance, said first voltage being impressed across said potentiometers and said resistance in series, said potentiometers being individually wound in substantial accordance with said desired function on cards formed into nearly complete coaxial circles, radial brushes individually traversing said potentiometers and mounted in fixed parallelism with each other on a second shaft coaxial with said circles, means for rotating said second shaft at four times the rate of rotation of said given shaft, an output circuit having a pair of terminals one of said terminals being permanently connected to the end of said resistance remote from said potentiometers, the other of said terminals being connected in overlapping succession to the junction of said resistance with said potentiometers, to one and to the other of said radial brushes and switching means for effecting said overlapping connections, said switching means being controlled by a cam on a third shaft rotating at twice the rate of rotation of said given shaft whereby said other terminal is momentarily connected to said junction at intervals of a half rotation of said given shaft and between said momentary connections is connected alternately to one and to the other of said brushes during successive quadrants of the rotation of said given shaft.

DAVID B. PARKINSON.